Feb. 26, 1952 — R. MONRO ET AL — 2,586,851
DIAPHRAGM OPTICAL GAS MASK
Filed Oct. 16, 1935 — 11 Sheets-Sheet 1

INVENTORS
RANDOLPH MONRO
IRVING C. BROWN
CLARENCE N. HINKAMP
FRANK J. M. PARDUHN
BY Millard F. Peake, Jr.
ATTORNEY.

Feb. 26, 1952    R. MONRO ET AL    2,586,851
DIAPHRAGM OPTICAL GAS MASK

Filed Oct. 16, 1935    11 Sheets-Sheet 2

FIG. 4

INVENTORS
RANDOLPH MONRO
IRVING C. BROWN
CLARENCE N. HINKAMP
FRANK J.M. PARDUHN
BY
ATTORNEY.

Feb. 26, 1952 R. MONRO ET AL 2,586,851
DIAPHRAGM OPTICAL GAS MASK
Filed Oct. 16, 1935 11 Sheets-Sheet 5

INVENTORS
RANDOLPH MONRO
IRVING C. BROWN
CLARENCE N. HINKAMP
FRANK J. M. PARDUHN
BY Millard F. Peake, Jr.
ATTORNEY.

Feb. 26, 1952 R. MONRO ET AL 2,586,851
DIAPHRAGM OPTICAL GAS MASK
Filed Oct. 16, 1935 11 Sheets-Sheet 6

INVENTORS
RANDOLPH MONRO
IRVING C. BROWN
CLARENCE N. HINKAMP
FRANK J. M. PARDUHN
BY Millard F. Peake, Jr
ATTORNEY.

Feb. 26, 1952   R. MONRO ET AL   2,586,851
DIAPHRAGM OPTICAL GAS MASK
Filed Oct. 16, 1935   11 Sheets-Sheet 7

INVENTORS
RANDOLPH MONRO
IRVING C. BROWN
CLARENCE N. HINKAMP
FRANK J. M. PARDUHN
BY Millard F. Peake, Jr.
ATTORNEY.

Feb. 26, 1952 R. MONRO ET AL 2,586,851
DIAPHRAGM OPTICAL GAS MASK
Filed Oct. 16, 1935 11 Sheets-Sheet 8

FIG. 21 INVENTORS
RANDOLPH MONRO
IRVING C. BROWN
CLARENCE N. HINKAMP
FRANK J. M. PARDUHN
BY Millard F. Peake, Jr.
ATTORNEY.

Patented Feb. 26, 1952

2,586,851

UNITED STATES PATENT OFFICE 2,586,851

DIAPHRAGM OPTICAL GAS MASK

Randolph Monro, Edgewood, and Irving C. Brown, Baltimore, Md., and Clarence N. Hinkamp and Frank J. M. Parduhn, Washington, D. C., assignors to United States of America as represented by the Secretary of War Application October 16, 1935, Serial No. 45,256

7 Claims. (Cl. 128—141)

(Granted under the act of March 3, 1883, as amended April 30, 1928; 370 O. G. 757)

The invention described herein may be manufactured and used by or for the Government for governmental purposes, without the payment to us of any royalty thereon.

This invention relates in general to the apparatus for the protection of individuals from contaminated atmospheres, more particularly to a gas mask having small eyepieces adapted to fit against the eye socket of the wearer and having a diaphragm for voice transmission. Other features include a head pad with a spring type head harness for supporting a small canister on the back of the head, from which rubber tubes are so conducted that the inhaled air is caused to impinge directly on the interior surface of the lenses. The entire assembly is arranged to provide the requisite of comfort, especially at the eye and chin positions, also to facilitate the use of and avoid interference with the apparatus with which the wearer will come in contact particularly as regards the use of 20-ft. range finders and telephone head sets.

One object of this invention is to provide in the gas mask, comfortable eyepieces and which will permit the wearer of the mask to bring his eyes within the focal distance of optical instruments.

Another object of this invention is to fabricate the facepiece so as to provide a comfortable chin support and accommodate the angletube by means of a single seam at the chin position.

Another object of this invention is to so arrange the eyepiece portion in a semimolded facepiece that when the chin seam is assembled, the eyepieces will be in a plane normal to the line of sight of the wearer, without further manipulation of the facepiece or components.

Another object of this invention is to mold the inhalation tube stems integral with the portion of the facepiece material adjacent to the eyepieces, and in a position permitting the attachment of the corrugated hose tubes leading from the canister to fall beneath the wearer's ears so as to avoid telephone head set interference.

Another object of this invention is to cause substantially all the inhaled air to impinge directly on the interior surfaces of the lenses, without the use of deflectors within the facepiece.

Another object of this invention is to provide a light-weight angletube so constructed that there is a minimum of parts.

Another object of this invention is to provide means for the wearer's voice to be readily heard, directly, over the telephone, or through voice tubes.

Another object of this invention is to cause the sound of the voice so transmitted to the interior of the facepiece to be reinforced by the synchronous vibration of a diaphragm and the exhalation valve located in front of it.

Another object of this invention is to protect the exhalation valve within the contour of the angletube without the use of special or projecting guards.

Another object of this invention is to provide an exhalation valve stem assembled within the contour of the angletube for simplifying the replacement of the exhalation valve.

Another object of this invention is to provide means for the drainage of saliva and perspiration of the facepiece through the exhalation valve.

Another object of the invention is to provide means for interlocking the lens and facepiece material without distortion of the latter.

Another object of this invention is to provide a threaded bridge for maintaining the eyepieces in a fixed plane and for adjusting the eyepieces to correspond with the interpupillary distance of the wearer.

Another object of this invention is to provide means in the angletube construction to improve voice transmission by stretching the diaphragm during assembly.

Another object of this invention is to provide a millimeter scale on the threaded bridge, to function similarly to a scale used on various range finding instruments for setting the eyepieces to correspond with the interpupillary distance of the operator.

Another object of this invention is to minimize kinking of the inhalation tubes by the use of corrugated hose.

Another object of this invention is to provide the corrugated hose with integrally molded elbows for attaching to the air purifying canister.

Another object of this invention is to provide a head pad for securely supporting the canister and to permit the quick detachment of latter for replacement.

Another object of this invention is to provide means in the head pad to accommodate a spring type head harness.

Another object of this invention is to provide small eyepieces so that the entire surfaces of the lenses can be impinged upon by the incoming air and so that the extraneous light can more readily be excluded when using optical instruments.

Other objects and advantages relate to the details of the process and the specific structure of the mask, all as will more fully appear from the following description, taken in connection with the accompanying drawings, in which:

In order to make this invention clear, the fabrication of the facepiece from the blank stock will be first described. The facepiece is preferably made from a plurality of sheets of uncured rubber plied together. Three sheets of rubber have been found satisfactory, the sheets being of any desired composition which is impervious to liquid and gaseous vesicants and toxics. These sheets after assembly are molded to shape in special molds in order to correctly position the eye portions and the inhalation tubes.

Figure 31:
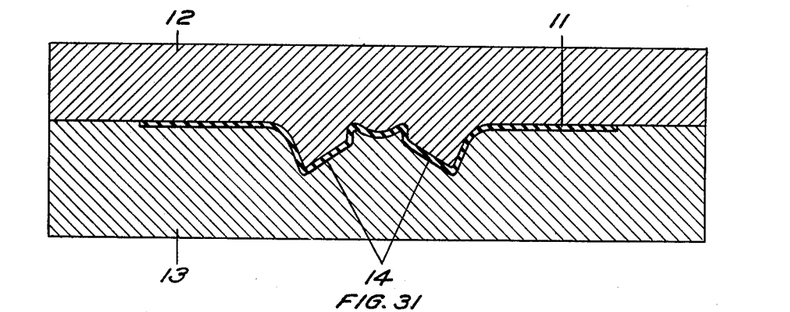
Fig. 31 is a section of the mold and faceblank, the latter taken on line 31—31 of Fig. 23.

Referring to Figs. 31 to 35, the rubber sheets 11 are placed in special molds 12 and 13 which are formed to shape the two eye portions 14 as shown in Fig. 31. Between the two eye portions 14 the rubber is bowed outward slightly to clear the bridge of the nose. As indicated by the shade lines in Figs. 23, 24 and 25, the central portion of the mask designated 15 is molded to form an outwardly extending portion which is at the maximum distance from the main portion of the mask at the lower edge. The eye portions 14 are circular, and are positioned at an angle of about 40° to the plane of the facepiece.

Figure 32:
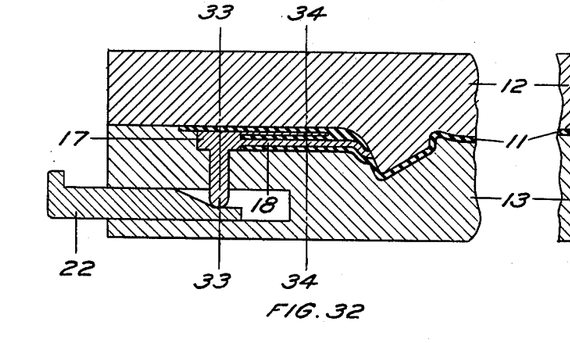
Fig. 32 is a sectional view illustrating the complementary mold sections in pressing position for homogeneously incorporating the sheets forming the inhalation tubes with the main portion of the faceblank, the faceblank section taken on line 32—32 of Fig. 23.
Figure 33:
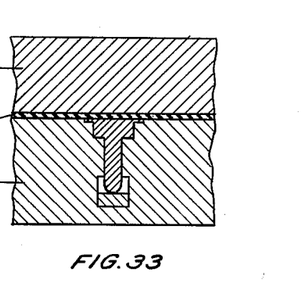
Fig. 33 is a section on line 33—33 of Fig. 32.
Figure 34:
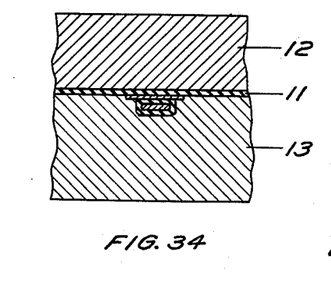
Fig. 34 is a section on line 34—34 of Fig. 32.
Figure 35:
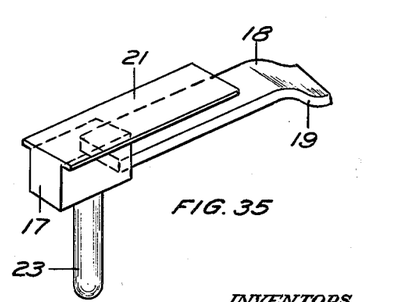
Fig. 35 is a perspective view of core used with the molds.

One of the novel features of this invention is the process of providing inlet tubes so positioned that incoming air impinges on the lenses to prevent fogging. By this invention these inlet tubes are integrally formed on the facepiece by vulcanization in the special molds. From Figs. 23 to 25 it will be seen that the inlet tubes 16 slant upwardly toward the eye openings and are joined to the facepiece at the bulges which support the lenses. As seen in Fig. 32, the lower mold 13 has recesses on its upper surface to accommodate removable cores 17, only one such core being shown. Each core 17 (shown in Fig. 35) has a thin rectangular tongue 18 bent downwardly at 19 near its outer end, this bent-out end 19 resting against the facepiece near the eye opening when assembled.

Figures 23, 24:
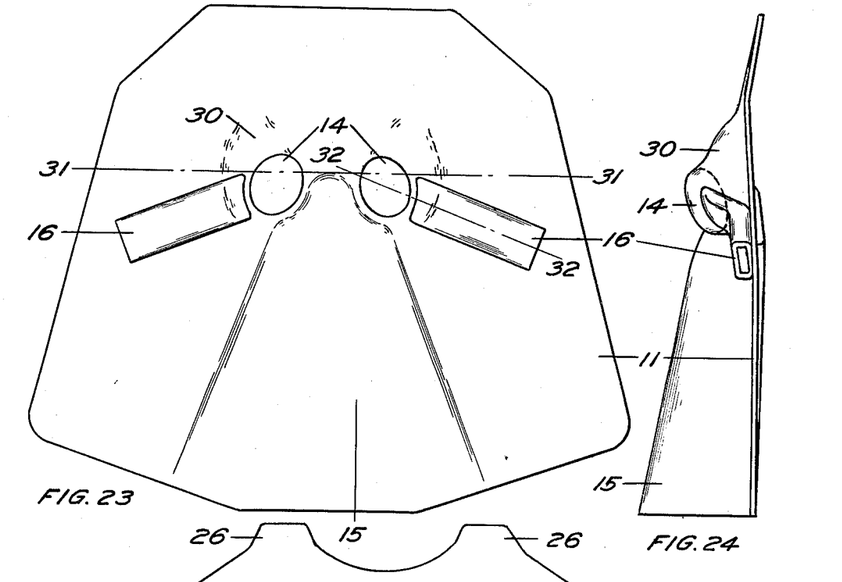
Fig. 23 is a plan of the molded blank.
Fig. 24 is a side elevation of the molded blank.

Prior to assembly in the molds, the two rectangular portions 18 are wrapped in one or more sheets of uncured rubber of the desired thickness and placed as seen in Fig. 32. The ends 19 of tongues 18 pierce through the facepiece as seen in Fig. 32. The spacer leaf 21 of mold 17 is positioned between the facepiece 11 and the rubber forming the air inlet. The rubber is then vulcanized by heat treatment in the usual manner, and the facepiece is shaped as seen in Figs. 23 and 24, with the eye portions protruding outwardly. The sheet rubber around tongue 18 of the core is vulcanized to the facepiece and these parts become integrally united. The molds may be heated by external heat, the rubber sheets being homogeneously united by the simultaneous heat and pressure.

In order to assist in separating the molds, a wedge 22 is provided in the mold 13 which coacts with the rounded nose 23 of core 17. After the molds are separated, the core 17 is withdrawn, leaving the inlet tubes 16 spaced from the facepiece a distance equal to spacer 21 of the core. The tongue 18 forms the air passage and the bent portion 19 causes the incoming air to impinge directly upon the lenses.

Figures 25, 26:
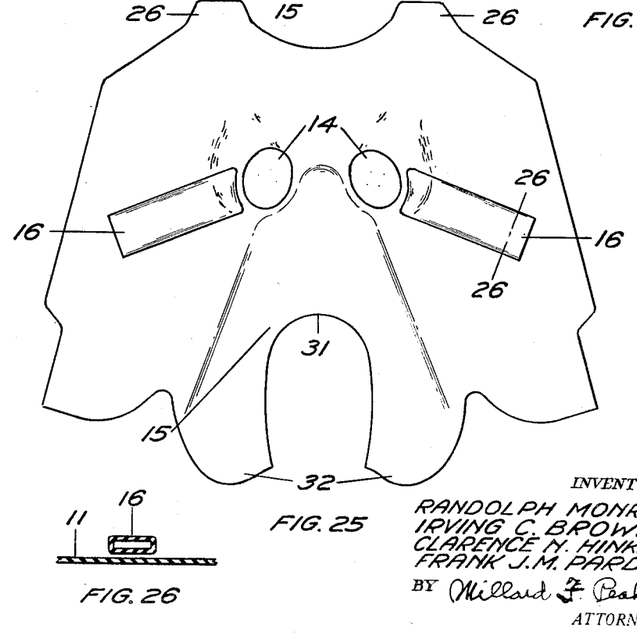
Fig. 25 is a plan of the died out blank from which the facepiece is formed.
Fig. 26 is a section on line 26—26 of Fig. 25.
Figure 30:
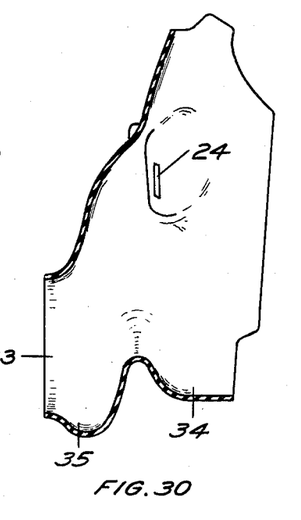
Fig. 30 is a section on line 30—30 of Fig. 28.

After removal from the molds, the facepiece 11 is shaped as seen in Figs. 23 and 24 with the inlet tubes 16 spaced as seen in Fig. 26. The rubber of the facepiece is then trimmed around the inner end of inlet tube 16, leaving the opening 24, Fig. 30, for entrance of air to the facepiece. The end portion of each inhalation tube 16 has a short tube 25, Fig. 2, inserted therein and the corrugated hose members leading from the canister are secured thereto.

The purpose of nipple 25 is to reinforce the connection by preventing collapse of tube 16 when hose 92 is assembled thereon.

Figure 27:
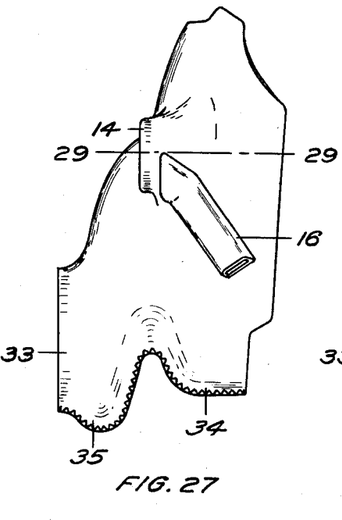
Fig. 27 is a side elevation illustrating the plane of the eyepieces after the edges of the gores have been connected.
Figure 28:
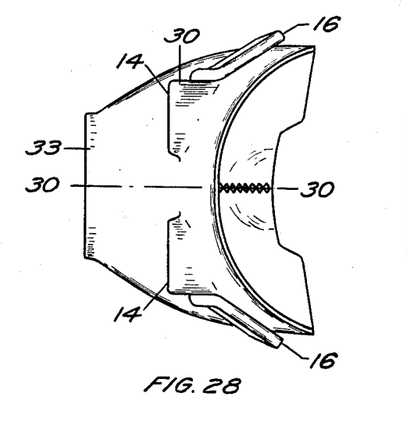
Fig. 28 is a plan thereof.
Figure 29:
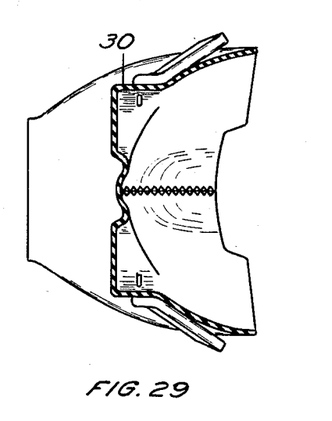
Fig. 29 is a section on line 29—29 of Fig. 27.

As seen from Fig. 24, the special molds shape the facepiece so that the eye portions 14 are flat disks on the smaller ends of truncated cones 30 which slant downwardly and inwardly toward the center of the facepiece. These truncated cones 30 are so oriented in the molded faceblank that the surface 14 of the eyepieces will assume a plane normal to the line of sight when the face blank is stitched, as seen in Fig. 27. The molded shape at and above the eyepieces is also such that contact with the forehead of the wearer is approximately at the superciliary ridges above the eyebrows. This prevents the facepiece from exerting painful pressure on the supraorbital nerve.

The molded shape at the eyepieces herein described further allows for positioning the observer's eyes at the proper distance from an optical instrument. The full field of vision of the instrument is permitted by this arrangement.

Figure 6:
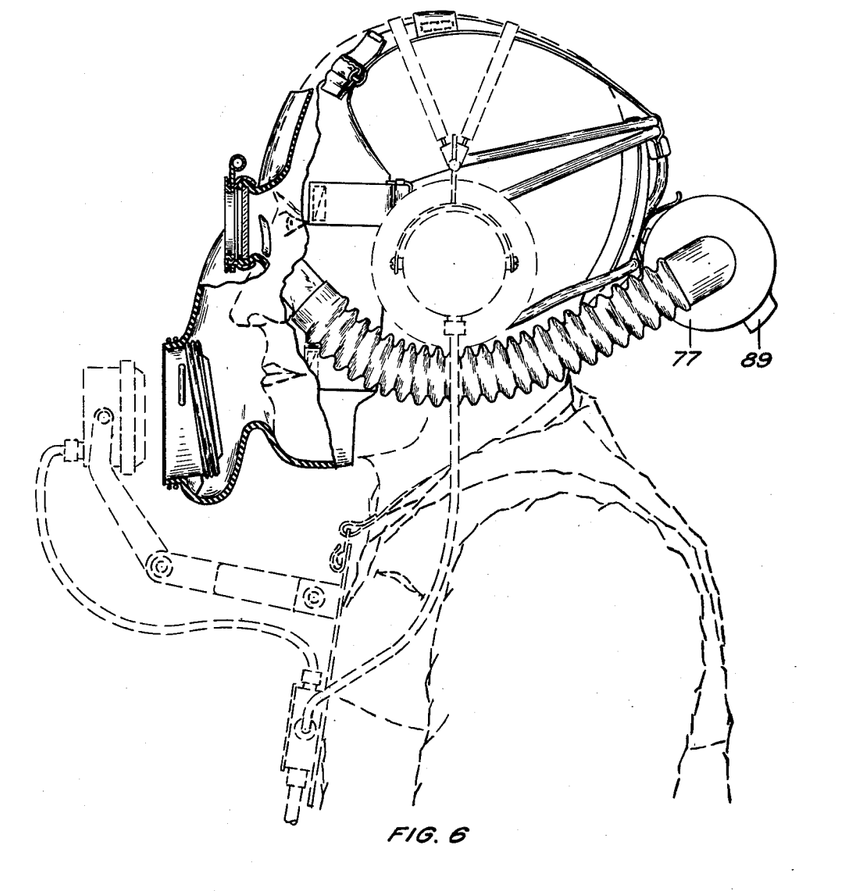
Fig. 6 is a side elevation of the mask partly in section, the section taken on line 6—6 of Fig. 4, with the telephone equipment shown as worn with the mask.

In order to fit various sizes and shapes of faces, it is usually necessary to provide three or four sizes of facepiece. However, the molds used 'n making the facepiece as herein described may be used for all sizes, the difference in the sizes being taken care of when the molded facepiece is cut as shown in Fig. 25. The tubes 16, one for each eyepiece, are arranged on the facepiece as seen in Fig. 27 at a suitable inclination for connection to the two corrugated hose members which are positioned below the wearer's ears as seen in Fig. 6 so as to avoid interference with a telephone head set.

Figures 1, 2, 3, 36, 37:
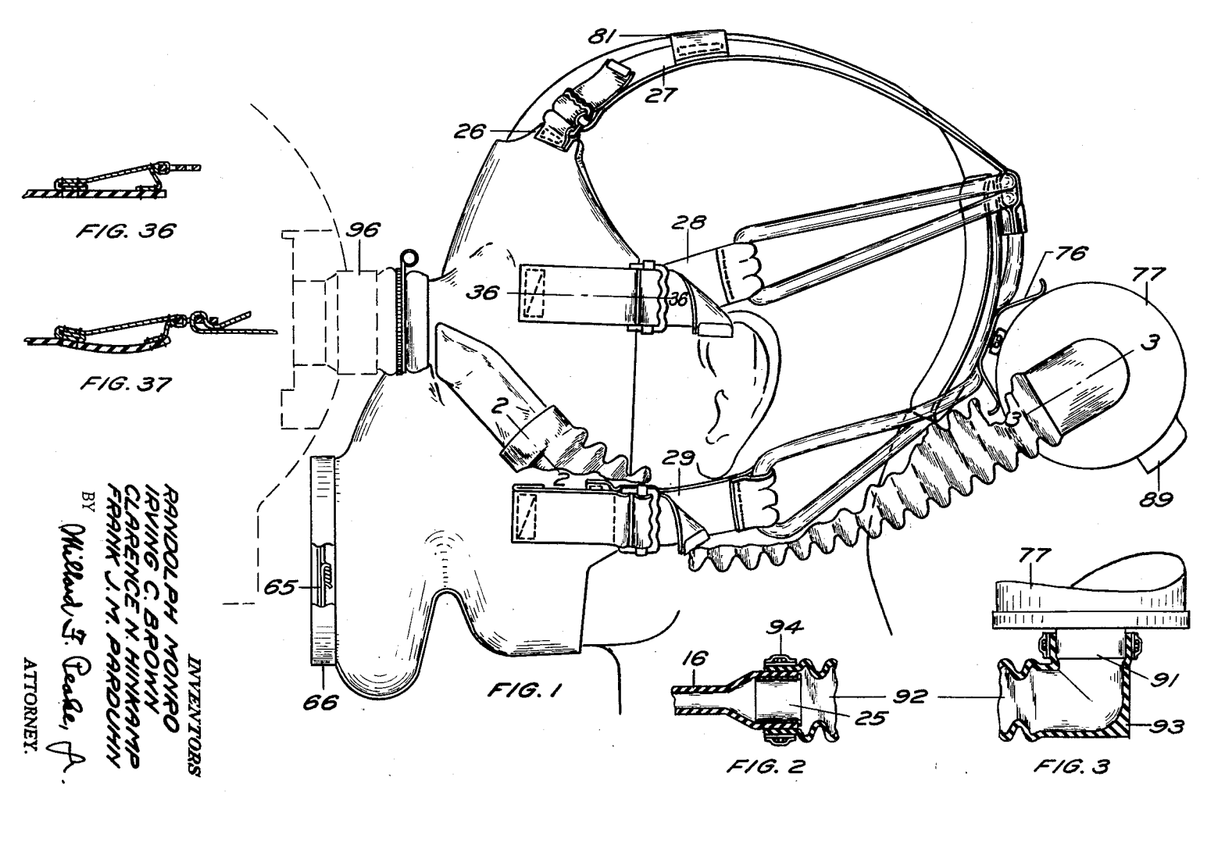
Fig. 1 shows a side elevation of the mask with a portion of corrugated hose broken away, the range finder being shown as adapted to the mask.
Fig. 2 is a section on line 2—2 of Fig. 1.
Fig. 3 is a section on line 3—3 of Fig. 1.
Fig. 36 is a section on line 36—36 of Fig. 1.
Fig. 37 is a similar section showing the parts where tension is applied to the head harness.
Figure 4:
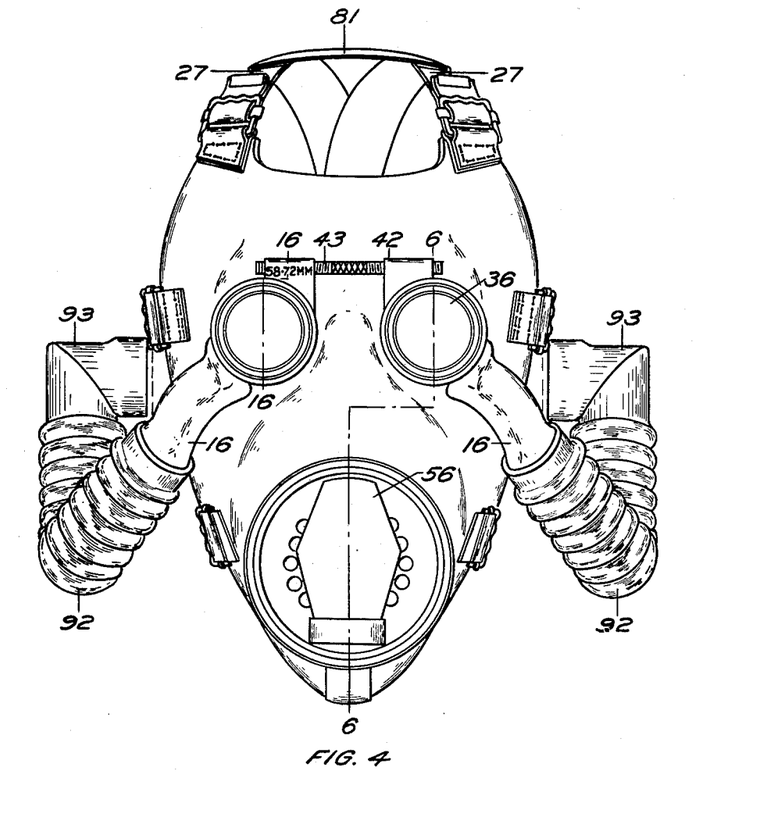
Fig. 4 is a front elevation of the mask.

The molded facepiece after removal from the molds is cut or stamped out as seen in Fig. 25. Two upper tabs 26 are provided for connection to the harness straps 27 of the head pad, other straps 28 and 29 being connected as seen in Fig. 1. The lower edge of the facepiece is formed with a central curved gore 31, Fig. 25, with projections 32 on opposite sides thereof. The lower edge beyond projection 32 curves outwardly and upwardly as shown, both sides being of the same shape. The projections 32 are then stitched together, the stitching being carried back to the two sides, the gore 31 forming a substantially circular opening projecting forwardly, as seen at 33, Figs. 27 and 30.

Figure 5:
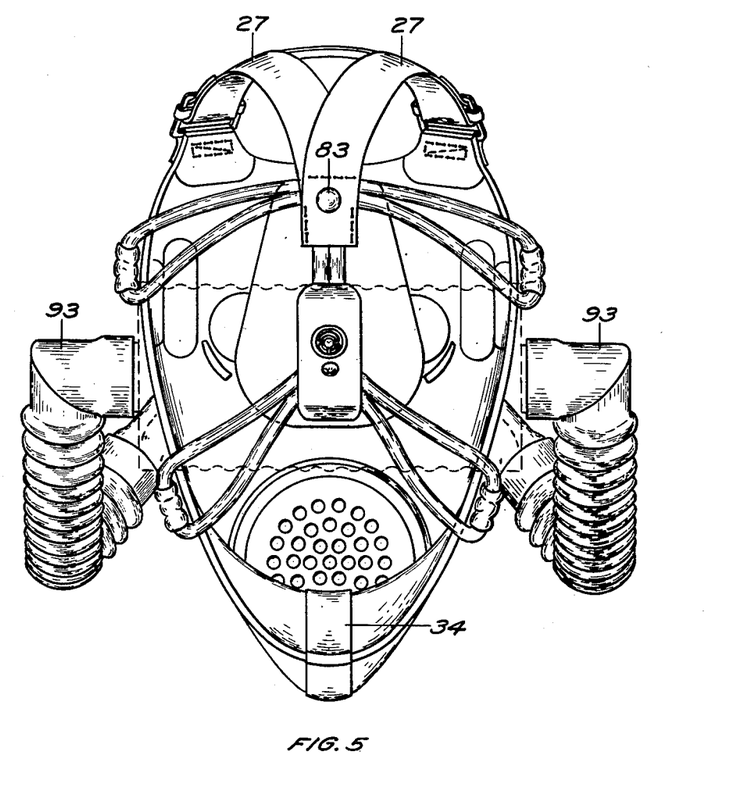
Fig. 5 is a rear elevation of the mask.

When thus stitched, the joint extends from the lower front central portion to the throat section and may be made gas tight by taping as seen at 34, Fig. 5. The facepiece thus made is given the shape shown in Figs. 27 to 30. The lower curved edges which are stitched provide a chin rest 34 and also a pocket 35 in which drainage such as saliva and perspiration collects. By tilting the head forward during use of the mask and blowing sharply, purging of this pocket is accomplished through the exhalation valve stem and valve port, hereinafter described.

When using optical fire-control instruments on board ship, it is very advantageous to have a cushioning facial support such as this novel facepiece provides. During heavy firing or on other occasions when there is heavy concussion, the observer's eyes will be protected from injury by such instruments.

Figure 9:
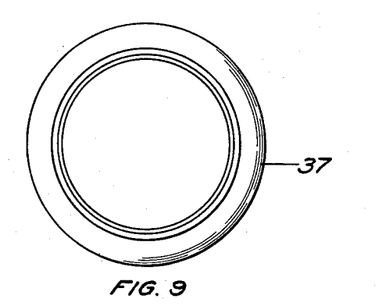
Fig. 9 is a front elevation of the eyering.
Figure 10:
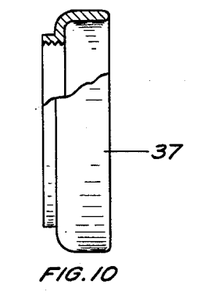
Fig. 10 is a side elevation, partly in section of Fig. 9.
Figure 14:
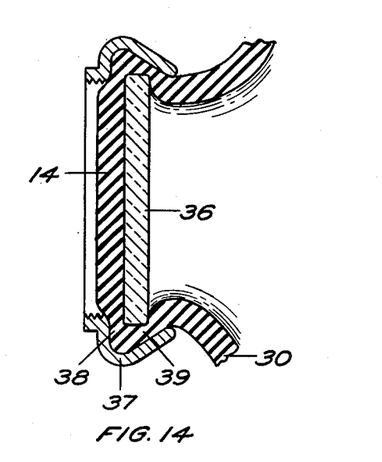
Fig. 14 shows a section of the eyepiece after final assembly of the eyering.

After stitching, the lenses are secured to the facepiece. Referring to Figs. 13 to 16, the glass lenses 36 are inserted from within the mask and are pressed forwardly against eye portions 14 within truncated cones 30, and separate threaded eye rings 37, Figs. 9 and 10, are slipped over the outside, see Fig. 13. Each eye ring 37 is then swaged over the lens, as seen in Fig. 14, thus firmly holding each lens in place on the facepiece, the rubber facepiece material being compressed at 38 and 39 to form a gas-tight joint around the lens. A suitable lubricant, such as zinc stearate, is used to facilitate the swaging of the eyering over the lens.

Figures 7, 8:
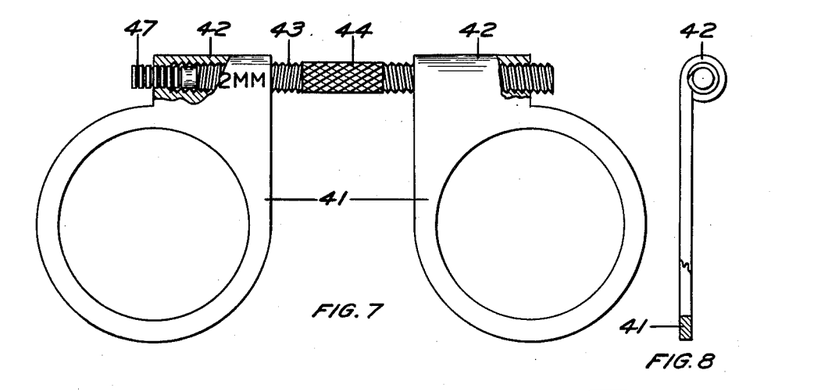
Fig. 7 is a front elevation of the spectacle frame, with the holder broken away.
Fig. 8 is a side elevation, partly in section, of Fig. 7.
Figure 15:
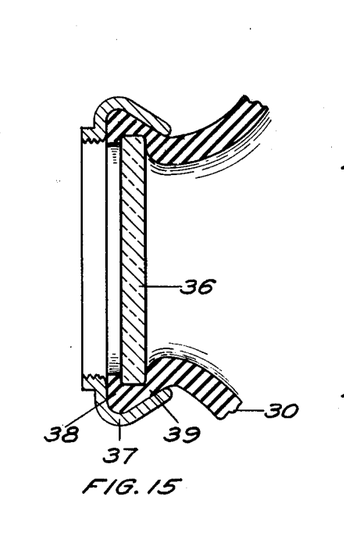
Fig. 15 shows a section of the eyepiece after removing the rubber facepiece material from in front of the lens.

The rubber eye portions 14 are next cut away from in front of the lenses as seen in Fig. 15 by a rotary cutter lubricated with water. The spectacle frame shown in Figs. 7 and 8 is then put in position, this frame including two rings 41 each having a lug 42. The lugs 42 of each frame have right and left hand threads in openings through the same for the reception of an adjusting screw 43 provided with a knurled grip portion 44.

Figure 11:
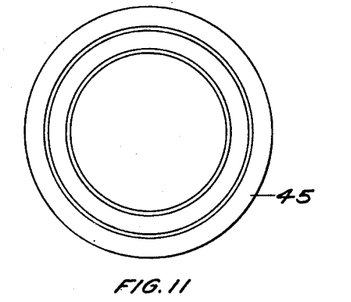
Fig. 11 is a front elevation of the adapter.
Figure 12:
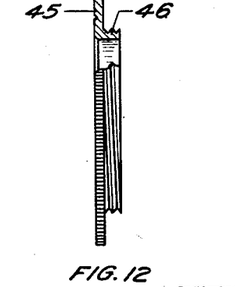
Fig. 12 is a side elevation partly in section of Fig. 11.
Figure 13:
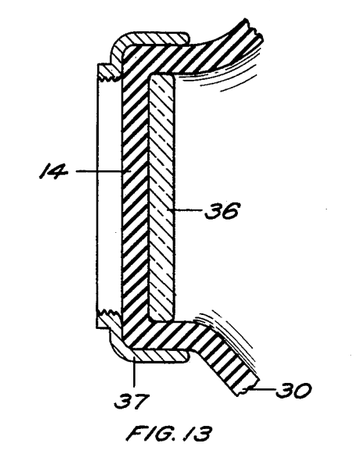
Fig. 13 shows a section of the eyepiece before final securing of the eyering.
Figure 16:
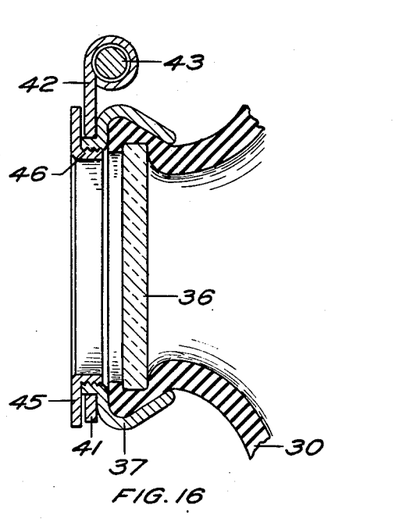
Fig. 16 is a section on line 16—16 of Fig. 4.

The spectacle frame is secured in assembled relation with the facepiece by retaining rings 45, Figs. 11, 12 and 16, which have annular flanges 46 for threaded engagement with the eye rings 37. From Fig. 16 it will be seen that the retaining rings 45 do not bind the spectacle frame against the eye rings 37. This arrangement allows the spectacle frame rings 41 to oscillate within their mounting as the adjusting screw 43 is operated back and for.h, thereby avoiding any twisting strain on the facepiece which might cause it to gape at the periphery.

The adjusting screw 43 is provided with millimeter graduations 47, see Fig. 7, at one end which register with the edge of lug 42. The eyepieces can be adjusted to the correct interpupillary distance for the wearer by rotating the screw 43, so that binocular instruments may be used while wearing the mask. By advancing the screw one millimeter on scale 47, the eyepiece spacing is increased two millimeters. The facepiece is so molded that the eyepieces are at the minimum interpupillary distance without stretching or compressing the facepiece, whereas in the maximum position the rubber facepiece is stretched between the eyepieces. Channeling or gaping of the facepiece periphery at the forehead and between the eyes is prevented by this stretching action to accommodate the maximum setting.

Figures 17, 18:
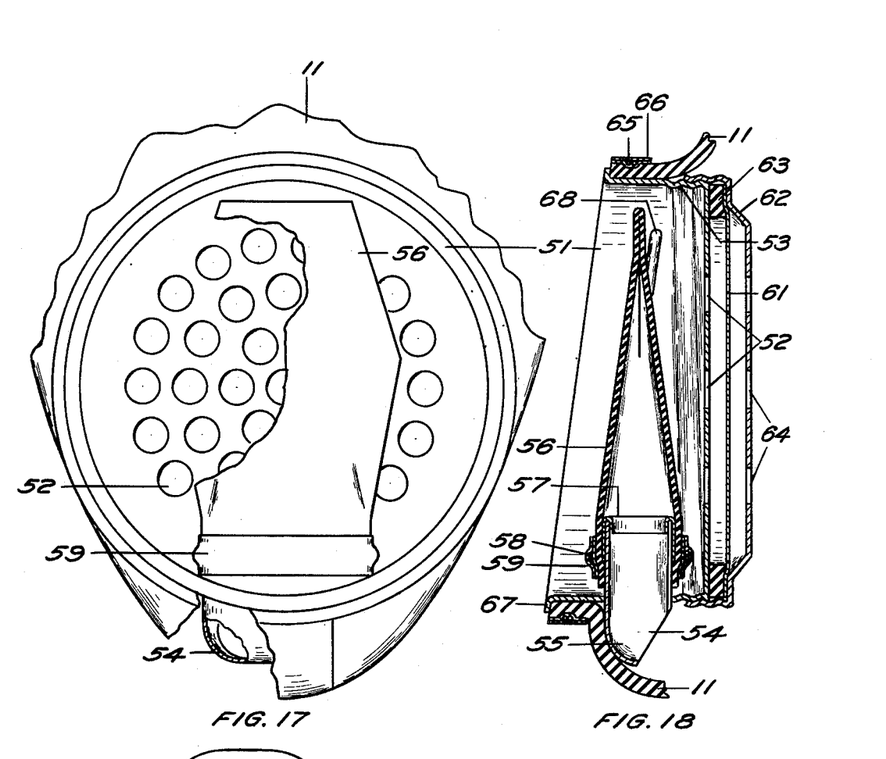
Fig. 17 is a front elevation, partly in section, of the angle tube portion of the mask.
Fig. 18 is a central section thereof.
Figure 19:
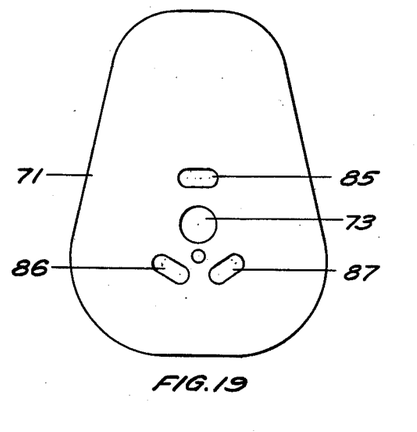
Fig. 19 is an elevation of the plate used on the head harness.
Figures 20, 22:
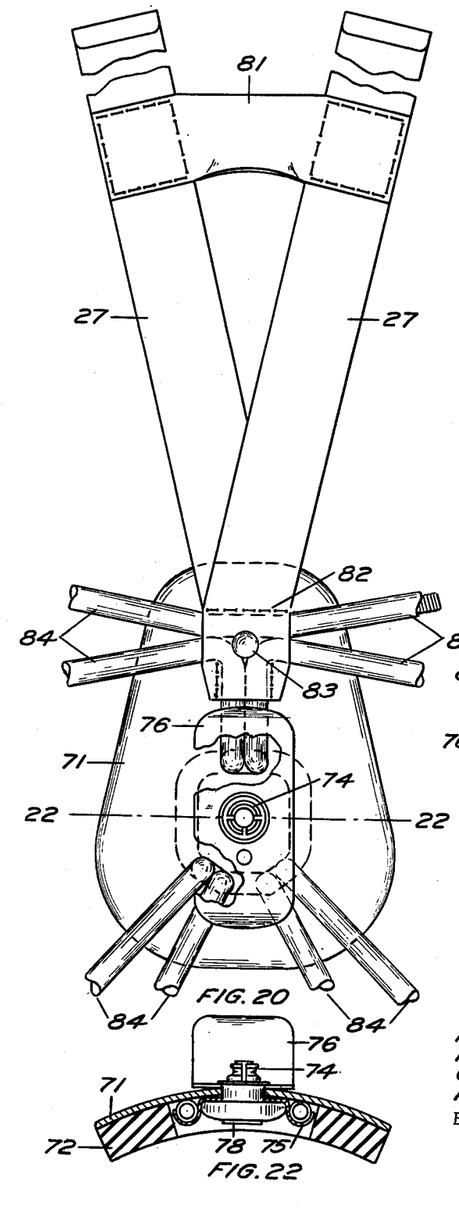
Fig. 20 is a front elevation, partly in section, of the head harness.
Fig. 22 is a section on line 22—22 of Fig. 20.

The assembly and insertion of the speaking diaphragm and the exhalation valve will now be described. These parts are mounted in the circular opening 33, Figs. 27 and 30. An angletube body 51, Figs. 17 and 18, comprises a sheet metal cup having a plurality of openings 52 in its bottom. This cup is not uniform in depth, the rim being sloped as seen in Fig. 20 and the side wall near the bottom having rolled threads 53 formed thereon. Secured to the long side of the angletube body 51 and projecting into the cup is an exhalation valve stem 54 comprising a hollow sheet metal member of oval cross-section. This stem 54 has its outer wall slightly longer than the inner one and curved inward at 55 to follow the curvature of the face blank as seen in Fig. 18. This domed or curved portion 55 prevents cutting of the faceblank by the edge of stem 54 and prevents closing of the exhalation opening should the facepiece be compressed at this point while the mask is being worn.

The exhalation valve comprises a bag 56 of soft pliable rubber provided with slits on its upper edges. Bag 56 is secured to stem 54 by first wrapping a strip of adhesive tape 57 around the upper end of the stem and turning it down over the rim thereof and then cementing the bag in place, and binding it with wire 58 covered with tape 59. Since the valve extends into and is protected by the cup member 51, the use of an additional valve guard is obviated and the entire valve is readily accessible for inspection and replacement.

The diagram 61 is secured to the cupped angletube body 51 by clamp 62 which is threaded on the lower end of cup 51, with a rubber gasket 63 positioned between the diaphragm and cup 51. The diaphragm 61 may be any suitable impervious material such as silk or linen fabric impregnated with a phenolic condensation product. The retaining clamp 62 has its bottom bowed inwardly to clear the diaphragm and allow vibrations of the same, the bottom having a plurality of openings 64. By the assembly herein described, buckling and twisting of the diaphragm is avoided. It has been found in practice that glycerine applied to the faces of gasket 63 and diaphragm 61 acts as a lubricant and prevents drag of these parts during assembly.

From Fig. 18, it will be seen that the rubber gasket 63 is wider than the corresponding face of clamp 62, so that the inner portion of gasket 63 is not compressed when clamp 62 is tightened. This free portion of the gasket presses resiliently against the diaphragm 61 and this stretching action results in a tight and buckle-free diaphragm with improved voice transmission qualities.

The cupped angletube member 51 is secured to the facepiece by stretching the facepiece portion 33 over the angletube to the position shown in Fig. 18. Binding wire 65 and tape 66 make a gas tight joint and flange 67 and ridges 68 assist in making a secure joint.

Figure 21:
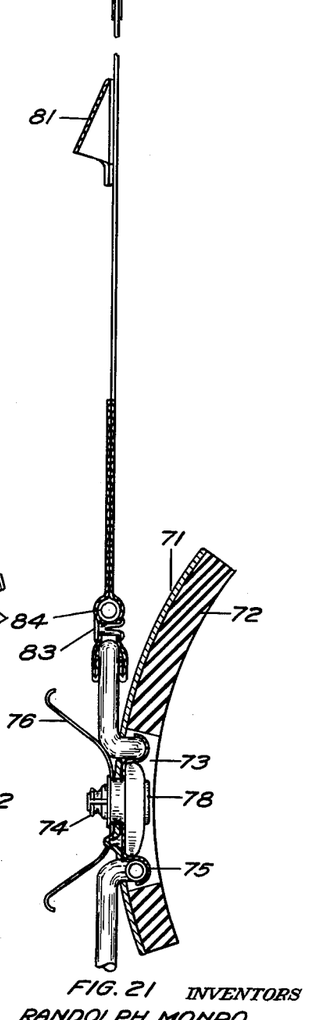
Fig. 21 is a central section thereof.

The harness consists of an oval shaped plate 71, Figs. 19 to 22, cupped to fit the back of the head, with a sponge rubber pad 72 processed thereto, which cushions the canister from the wearer's head. A central recess 73 in the plate and pad accommodates one part 74 of a separable fastener, the cooperating part of the fastener being secured to the canister. As seen in Fig. 21, fastener 74 is upset over the edge of plate 71, and a shield 75 is held in place by the fastener. Shield 75 comprises a flat cup having a curved rim or flange positioned with the closed side of the flange toward the head of the wearer.

On the outer side of plate 71, the fastener also holds in place a spring plate 76 which resiliently presses against the canister when the same is secured to the head pad. The canister 77 shown in Figs. 1 and 6 is cylindrical and has the cooperating part of the separable fastener secured thereto midway of its length. To secure the canister to the head pad, the operating button 78 of the fastener is pressed inward and the canister 77 is pressed against the spring member 76 until the cooperating fasteners engage, when the button 78 is released. Spring member 76 holds the canister against twisting about the fastener and prevents accidental displacement.

The head pad is connected to the facepiece by harness members including the non-elastic webbing 27, 28 and 29, Fig. 1. The two webs 27 are connected across the head by web 81 and are joined at their other ends by stitching 82 and rivet 83. As seen in Fig. 1, the webs 28 and 29 are arranged to be above and below the ears of a wearer. These webs engage buckles to adjust their effective length and terminate in loops through which a spring member 84 passes.

Straps 28 and 29 as attached to the facepiece by means of straps 66 improve the fit of the facepiece at the temple and cheek positions as more fully described in Monro Patent No. 1,395,760.

Spring 84 comprises a closed loop of closely wound spring wire covered with a fabric sleeve which expands and contracts with the spring, as more fully described and claimed in patent to A. V. Motsinger, No. 1,942,442, January 9, 1934. The upper loops of spring 84 are secured to webs 27 by the stitching 82 and rivet 83. The two lower portions of this spring extend downwardly and through an opening 85 in plate 71 (see Fig. 19) into the channel provided by the rim of shield 75. The spring passes around the fastener 74 and out of openings 86 and 87 of plate 71 and is looped to the lower webs 29. The spring 84 is one continuous element with four outwardly extending closed loops.

An efficient gas-tight seal is secured by this harness construction, each web or strap being given resiliency by the fabric enclosed spring. The gas seal at the periphery of the facepiece is across the forehead approximately from temple to temple and from these temporal points down the sides of the face just in front of the ears and under the chin.

The cylindrical canister 77 is provided with an air inlet 89, Fig. 1, extending lengthwise thereof. Two outlets are provided, one on each end of the cylinder, suitable air filtering and purifying means being interposed between the inlet and the outlets. Each outlet comprises a nipple 91, Fig. 3, to which is secured the hose 92 leading to the interior of the mask.

Each of the two hose is of corrugated rubber having an integral molded elbow 93 at the canister end. As seen in Fig. 3, the hose must make a right angle turn to be secured to the canister. The integral elbow 93 simplifies this connection and the heavy molded construction prevents collapse of the elbow should this part be compressed while using the mask. Each hose 92 is slipped over the end of the inlet 16 and is secured thereto by binding wire and tape 94.

As previously indicated, this gas mask is designed essentially for use by personnel who must give commands or use optical instruments such as a range finder 96 shown by broken lines in Fig. 1. The lenses 36 are positioned close to the wearer's eyes and are normal to the line of vision, see Fig. 6, and are capable of ready adjustment to various interpupillary distances. The diaphragm is arranged in a natural position for transmitting speech, either directly or by a telephone as indicated in Fig. 6.

The head harness and hose do not interfere with the use of a telephone head set. The canister is positioned out of the way and does not interfere with the movements of the head, yet may be readily removed for replacement by manipulation of the separable fastener. The incoming air is made to impinge on the lenses without the use of more or less complicated and troublesome deflectors.

While we have shown and described the preferred embodiment of our invention, we wish it to be understood that we do not confine ourselves to the precise details of construction herein set forth by way of illustration, as it is apparent that many changes and variations may be made therein by those skilled in the art without departing from the spirit of the invention or exceeding the scope of the appended claims.

We claim:

1. In a gas mask, a facepiece having integral protuberances at the eye portions, lenses mounted in said protuberances, and means to adjust said lenses to vary the interpupillary distance between said lenses.

2. In a gas mask, a facepiece of resilient material having integral protuberances at the eye portions, lenses mounted in said protuberances, and means to adjust said lenses to vary the interpupillary distance between said lenses, the protuberances being so spaced that the facepiece is not stressed with the lenses at their minimum setting and the resilient facepiece may stretch to allow outward movement of the lenses.

3. In a gas mask, a facepiece of resilient material, lenses mounted therein, and means to adjust the interpupillary distance between said lenses, the lenses being maintained normal to the line of vision in all adjusted positions.

4. In a gas mask, a facepiece having an outwardly extending substantially cylindrical portion, means closing the inner end of said portion against ingress of air or gas, and an exhalation valve mounted within said cylindrical portion and protected thereby against injury.

5. In a gas mask, a facepiece having an outwardly extending substantially cylindrical portion, a speaking diaphragm closing the inner end of said portion against ingress of air or gas, and an exhalation valve mounted within said cylindrical portion and protected thereby against injury.

6. In a gas mask, a facepiece having an outwardly extending substantially cylindrical portion, means closing the inner end thereof, an exhalation valve extending upwardly within said cylindrical portion and in communication with the interior of the mask by a passageway adjacent the chin portion, and means to prevent closure of the passageway of the exhalation valve by pinching of the facepiece.

7. A gas mask comprising a facepiece, a speaking diaphragm mounted therein adjacent the mouth of a wearer, glass lenses mounted normal to the line of sight of a wearer, and means to adjust the interpupillary distance between said lenses while maintaining their normal position.

RANDOLPH MONRO.
IRVING C. BROWN.
CLARENCE N. HINKAMP.
FRANK J. M. PARDUHN.

REFERENCES CITED

The following references are of record in the file of this patent:

UNITED STATES PATENTS

| Number | Name | Date |
| --- | --- | --- |
| 488,190 | Edison | Dec. 20, 1892 |
| 844,952 | Mirovitch | Feb. 19, 1907 |
| 1,142,507 | Edison | June 8, 1915 |
| 1,177,025 | Ellis | Mar. 28, 1916 |
| 1,204,420 | Edison | Nov. 14, 1916 |
| 1,269,498 | Parsons | June 11, 1918 |
| 1,348,094 | Del Re | July 27, 1920 |
| 1,364,104 | Geer | Jan. 4, 1921 |
| 1,366,392 | Lamb et al. | Jan. 25, 1921 |
| 1,395,836 | Kops | Nov. 1, 1921 |
| 1,395,837 | Kops | Nov. 1, 1921 |
| 1,526,793 | King | Feb. 17, 1925 |
| 1,730,227 | McBride | Oct. 1, 1929 |
| 1,762,695 | Monro | June 10, 1930 |
| 1,807,681 | Baker | June 2, 1931 |
| 1,863,073 | Smythe | June 14, 1932 |
| 1,960,544 | Malcom | May 29, 1934 |
| 2,036,850 | Bullard | Apr. 7, 1936 |
| 2,038,267 | Bullard | Apr. 21, 1936 |
| 2,039,234 | Malcom | Apr. 28, 1936 |
| 2,088,164 | Dym | July 27, 1937 |

FOREIGN PATENTS

| Number | Country | Date |
| --- | --- | --- |
| 85,167 | Switzerland | Dec. 31, 1935 |
| 275,354 | Great Britain | Aug. 11, 1927 |
| 297,890 | Great Britain | Nov. 21, 1923 |
| 312,594 | Great Britain | May 28, 1929 |
| 384,886 | Great Britain | Dec. 15, 1932 |
| 399,496 | Great Britain | Sept. 25, 1933 |
| 526,062 | Germany | June 1, 1931 |
| 531,452 | Germany | Aug. 10, 1931 |
| 610,343 | Germany | Mar. 8, 1935 |
| 793,806 | France | Nov. 23, 1935 |